(12) United States Patent
Zhao et al.

(10) Patent No.: US 11,727,914 B2
(45) Date of Patent: Aug. 15, 2023

(54) INTENT RECOGNITION AND EMOTIONAL TEXT-TO-SPEECH LEARNING

(71) Applicant: MICROSOFT TECHNOLOGY LICENSING, LLC, Redmond, WA (US)

(72) Inventors: Pei Zhao, Redmond, WA (US); Kaisheng Yao, Remdond, WA (US); Max Leung, Redmond, WA (US); Bo Yan, Redmond, WA (US); Jian Luan, Redmond, WA (US); Yu Shi, Redmond, WA (US); Malone Ma, Redmond, WA (US); Mei-Yuh Hwang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/561,895

(22) Filed: Dec. 24, 2021

(65) Prior Publication Data

US 2022/0122580 A1 Apr. 21, 2022

Related U.S. Application Data

(63) Continuation of application No. 16/309,399, filed as application No. PCT/US2017/036241 on Jun. 7, 2017, now Pat. No. 11,238,842.

(30) Foreign Application Priority Data

Jun. 13, 2016 (CN) .......................... 201610410602.3

(51) Int. Cl.
*G10L 13/027* (2013.01)
*G06F 3/16* (2006.01)
(Continued)

(52) U.S. Cl.
CPC ............ *G10L 13/027* (2013.01); *G06F 3/167* (2013.01); *G10L 13/08* (2013.01); *G10L 15/063* (2013.01);
(Continued)

(58) Field of Classification Search
CPC ...... G10L 13/027; G10L 13/08; G10L 15/063; G10L 15/1807; G10L 15/22; G10L 15/26;
(Continued)

(56) References Cited

U.S. PATENT DOCUMENTS

| | | | |
|---|---|---|---|
| 2010/0042410 A1* | 2/2010 | Stephens, Jr. ........... | G10L 13/08 704/260 |
| 2013/0173269 A1* | 7/2013 | Adler ....................... | G10L 25/63 704/E15.001 |
| 2016/0078859 A1* | 3/2016 | Luan ....................... | G10L 13/033 704/260 |

OTHER PUBLICATIONS

Chang-Hyun Park, Dong-Wook Lee and Kwee-Bo Sim, "Emotion recognition of speech based on RNN," Proceedings. International Conference on Machine Learning and Cybernetics, 2002, pp. 2210-2213 vol. 4, doi: 10.1109/ICMLC.2002.1175432 (Year: 2002).*

* cited by examiner

*Primary Examiner* — Paras D Shah
*Assistant Examiner* — Athar N Pasha
(74) *Attorney, Agent, or Firm* — Newport IP, LLC; Leonard J. Hope

(57) ABSTRACT

An example intent-recognition system comprises a processor and memory storing instructions. The instructions cause the processor to receive speech input comprising spoken words. The instructions cause the processor to generate text results based on the speech input and generate acoustic feature annotations based on the speech input. The instructions also cause the processor to apply an intent model to the text result and the acoustic feature annotations to recognize
(Continued)

an intent based on the speech input. An example system for adapting an emotional text-to-speech model comprises a processor and memory. The memory stores instructions that cause the processor to receive training examples comprising speech input and receive labelling data comprising emotion information associated with the speech input. The instructions also cause the processor to extract audio signal vectors from the training examples and generate an emotion-adapted voice font model based on the audio signal vectors and the labelling data.

16 Claims, 16 Drawing Sheets

(51) Int. Cl.
    *G10L 13/08*     (2013.01)
    *G10L 15/06*     (2013.01)
    *G10L 15/18*     (2013.01)
    *G10L 15/22*     (2006.01)
    *G10L 15/26*     (2006.01)
    *G10L 25/63*     (2013.01)

(52) U.S. Cl.
    CPC .......... *G10L 15/1807* (2013.01); *G10L 15/22* (2013.01); *G10L 15/26* (2013.01); *G10L 25/63* (2013.01); *G10L 2015/223* (2013.01)

(58) Field of Classification Search
    CPC ... G10L 25/63; G10L 2015/223; G10L 25/03; G06F 3/167; G06F 40/30; G06N 3/0445; G06N 7/005; H04M 2250/74
    See application file for complete search history.

MOBILE COMPUTING DEVICE

INTENT RECOGNITION AND EMOTIONAL TEXT-TO-SPEECH LEARNING

CROSS-REFERENCE TO RELATED APPLICATIONS

This application is a continuation of U.S. patent application Ser. No. 16/309,399, filed Dec. 12, 2018, which is a U.S. National Stage Application of PCT/US2017/036241, filed Jun. 7, 2017, which claims benefit of Chinese Patent Application No. 201610410602.3, filed Jun. 13, 2016, which applications are hereby incorporated by reference. To the extent appropriate, a claim of priority is made to each of the above disclosed applications.

BACKGROUND

Text-to-speech applications are used to read written text aloud. Such applications may assist people with poor eyesight, people who are engaged in activity where reading the text is undesirable, such as driving a car, and people who may just prefer to hear text read aloud rather than having to read the text. In situations where text is read aloud to the user, the user often wants to hear a voice that conveys emotion that is appropriate for the text.

Speech-recognition applications are used to receive spoken commands and input from users. These applications may be useful when a user's hands or eyes are otherwise occupied, such as while driving a car, when a user is interacting with a computing device with a small or limited text input interface, and when a user simply speak rather than type input. Users often desire to speak normally and using ordinary language while interacting with speech-recognition applications.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

An example intent-recognition system comprises a processor and memory storing instructions. The instructions cause the processor to receive speech input comprising spoken words. The instructions cause the processor to generate text results based on the speech input and generate acoustic feature annotations based on the speech input. The instructions also cause the processor to apply an intent model to the text result and the acoustic feature annotations to recognize an intent based on the speech input. An example system for adapting an emotional text-to-speech model comprises a processor and memory. The memory stores instructions that cause the processor to receive training examples comprising speech input and receive labelling data comprising emotion information associated with the speech input. The instructions also cause the processor to extract audio signal vectors from the training examples and generate an emotion-adapted voice font model based on the audio signal vectors and the labelling data.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects.

DETAILED DESCRIPTION

Figure 1:
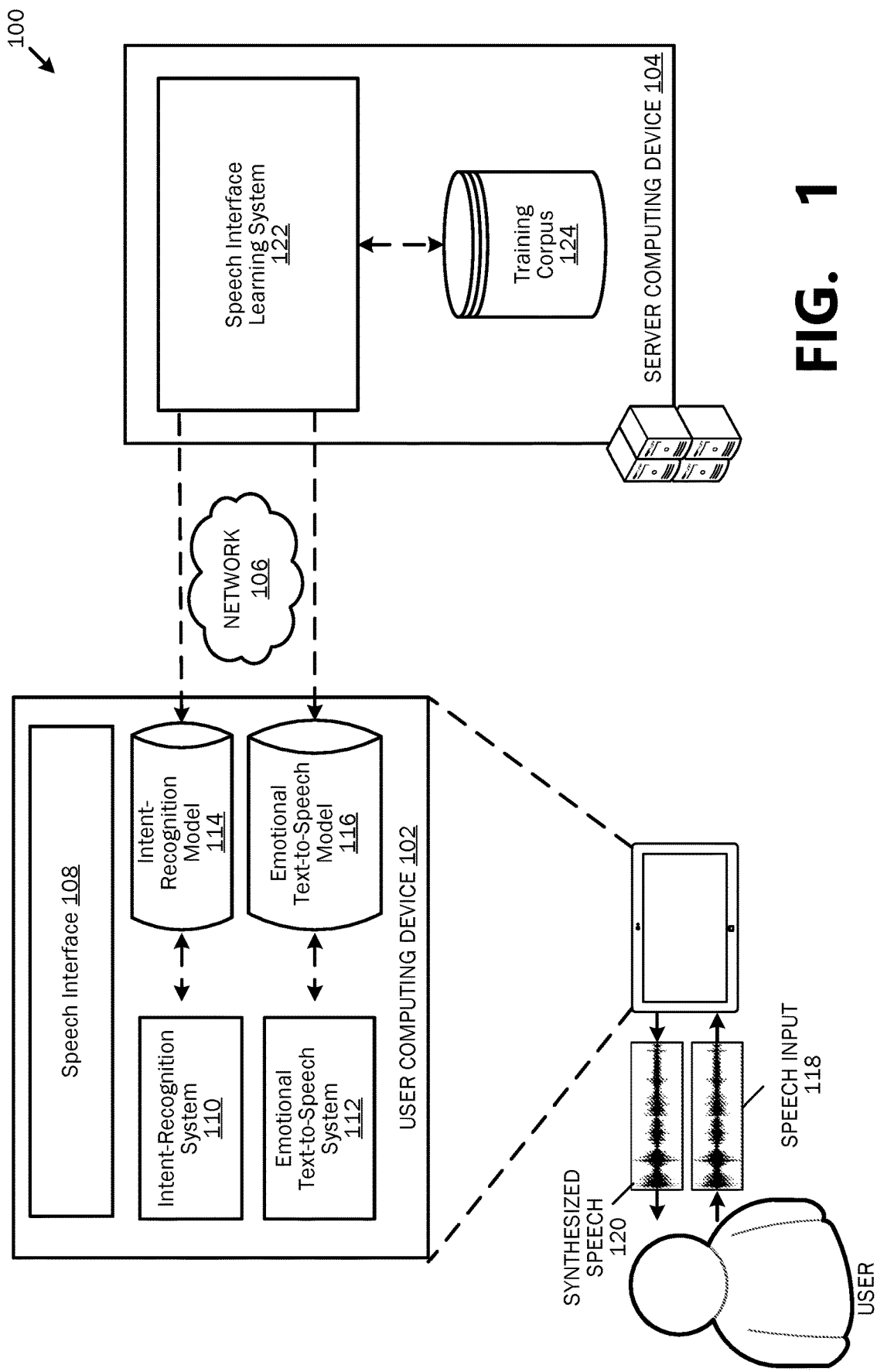
FIG. 1 illustrates an example system for providing a speech interface system and performing intent recognition and emotional text-to-speech learning.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A computing device may include one or both of an intent-recognition system and an emotional text-to-speech system. For example, the computing device may include a speech interface, such as a dialog management system, that combines elements of intent-recognition systems and emotional text-to-speech systems to permit a user to interact with the computing device and applications running on the computing device using speech input and audio output.

For example, a user may interact with the speech interface by speaking to the computing device. The intent-recognition system may convert speech input from the user into an intended action or input. The intent-recognition system may also determine a user's intent based on speech inputs received from a conversation between the user and one or more other users (e.g., a telephone call or in-person conversation between multiple users).

The intent-recognition system may include a speech-to-text system that converts speech input to one or more words that may then be interpreted as commands or other input to the computing device. The intent-recognition system may also extract acoustic features from the speech. Acoustic features are hyper-textual features of the speech input that go beyond the words that are spoken. Examples of acoustic features include prosody, pitch, energy, and spectral harmonics.

The intent-recognition system may use the extracted acoustic features to determine the speaker's intent from the speech input. For example, the same words may correspond to different intents based on how the words are said. For example, a human user will have different intents when saying "I'm very hungry" with a sarcastic tone rather than a neutral tone. When spoken with a neutral tone, the user may appreciate suggestions for nearby for restaurants or grocery stores; while, when spoken with a sarcastic tone the user may not want any suggestions. The recognized intent may be used to determine many different types of actions for the computing device to perform various such as sending messages, performing searches, and providing suggestions.

The emotional text-to-speech system may synthesize speech based on textual data. The textual data may come from many sources. For example, the textual data may be part of the results of a command executed based on the speech input from the user. As another input, the textual input may be generated based on a document that is open or an event that has occurred on or been detected by the computing device.

The synthesized speech may be generated with a desired emotion (e.g., in a manner to convey the desired emotion or to mimic the way a human user would speak with the desired emotion). The desired emotion may be specified with the textual data (e.g., in associated metadata). The emotion may also be determined based on the textual data or the results of an action performed by the computing device.

The synthesized speech may be played back to the user as audio output. In this manner, a user may interact with the computing device without using physical controls (e.g., touchscreen, buttons, keyboard, mouse, etc.). However, in other aspects, the emotional text-to-speech system and the intent-recognition system are not part of a speech interface and are separate from one another.

In some aspects, the intent-recognition system uses an intent-recognition model to recognize the intent of an associated speech input. The intent-recognition model may include several sub-models such as an acoustic model to convert audio signals to pronunciation signals (e.g., phones, phonemes, and pauses) and/or a natural language processing model to convert audio signals or pronunciation signals to words. The intent-recognition model may be generated (trained) by an intent recognition and emotional text-to-speech learning system based on training data.

Similarly, the emotional text-to-speech system may use an emotional text-to-speech model to synthesize speech in a manner that is intelligible, sounds similar to human speech, and expresses emotion similarly to human speech. The emotional text-to-speech model may also be generated (trained) by the intent recognition and emotional text-to-speech learning system based on training data.

As an example, the training data may comprise a plurality of training pairs, in which each training pair includes a speech input (e.g., an audio recording of one or more words being spoken) and a corresponding text input (e.g., a transcript of the words spoken in the speech input). In some aspects, the training continues based on at least some of the user-machine speech communication so that one or both of the text-to-speech system and the speech-recognition system continue to improve.

In some aspects, the intent recognition and emotional text-to-speech learning system uses the same training data to generate both the intent-recognition model and the emotional text-to-speech model. Beneficially, the intent recognition and emotional text-to-speech learning system can expand the amount of training data available for use in generating the intent-recognition model and the emotional text-to-speech model. Additionally, the intent recognition and emotional text-to-speech learning system may use the output of one or more components of the intent-recognition system to generate the emotional text-to-speech model. Similarly, the intent recognition and emotional text-to-speech learning system may use the output of one or more components of the emotional text-to-speech system to generate the intent-recognition model.

FIG. 1 illustrates an example system 100 for providing a speech interface system and performing intent recognition and emotional text-to-speech learning. In this example, the system 100 includes a user computing device 102 and a server computing device 104 that communicate over a network 106. The user computing device 102 may be any suitable computing device for implementing a speech interface 108 for interacting with a human user. For example, the user computing device 102 may be at least one of: a mobile telephone; a smart phone; a tablet; a phablet; a smart watch; a wearable computer; a personal computer; a desktop computer; a laptop computer; a gaming device/computer (e.g., the XBOX® gaming system from Microsoft Corporation of Redmond, Wash.); a media playback device (e.g., a BLU-ERAY® or DVD player, or streaming media player), a television; a navigation system; a vehicle telematics system; etc. This list is exemplary only and should not be considered as limiting.

In some aspects, the user computing device 102 includes a speech interface 108, an intent-recognition system 110, and an emotional text-to-speech system 112. For example, the speech interface 108 provides an interface for the user to interact with the user computing device 102 with spoken language. In some aspects, the speech interface 108 includes an intelligent personal assistant that can perform tasks or services for the user. Non-limiting examples of an intelligent personal assistant include the CORTANA® software and services from Microsoft Corporation of Redmond, Wash., the GOOGLE NOW® software and services from Google Inc. of Mountain View, Calif., and the SIRI® software and services from Apple Inc. of Cupertino, Calif. In other aspects, the speech interface 108 comprises other types of applications or services such as a screen reader or dictation system.

In some aspects, the speech interface 108 uses one or both of the intent-recognition system 110 and the emotional text-to-speech system 112 to interact with the user. Additionally or alternatively, one or both of the intent-recognition system 110 and the emotional text-to-speech system 112 interact with the user independently of the speech interface 108.

The intent-recognition system 110 recognizes user intent based on speech input 118 received from a user as spoken words, which may correspond to commands, input content, conversation with another human user, and the like. The speech input 118 may be received by the intent-recognition system 110 as an audio signal via a microphone. In some aspects, the intent-recognition system 110 uses an intent-recognition model 114 to recognize the audio signal of the speech input 118 as a sequence of words and an associated user intent. In some aspects, the intent-recognition model 114 includes a natural language processing model and an intent model.

The emotional text-to-speech system 112 generates synthesized speech 120 for playback to the user via, for example, a speaker. The speech may be synthesized to convey not only the words, but also an emotion. In some aspects, the emotional text-to-speech system 112 uses an emotional text-to-speech model 116 to generate the synthesized speech 120. The emotional text-to-speech model 116 may include a pronunciation model, a prosody prediction model, and one or more adapted emotional voice fonts.

The server computing device 104 includes a speech interface learning system 122. The speech interface learning system 122 generates the intent-recognition model 114 and the emotional text-to-speech model 116. In some aspects, the speech interface learning system 122 uses a training corpus 124 to generate the intent-recognition model 114 and the emotional text-to-speech model 116. The training corpus 124 may include a plurality of training examples that include a speech input (e.g., audio recordings of spoken words) and accompanying labelling data. The training corpus 124 may include a plurality of speech inputs from multiple speakers that have a wide variety of voices and speaking styles. The training corpuses may also include speech inputs that have been spoken to convey an emotion (or tones of voice) such as happy, sarcastic, or urgent.

The labelling data may include a transcript of the words spoken in the speech input, emotion, and intent information. In some aspects, some of the labelling data also includes acoustic feature annotations that, for example, identify the prosody and other acoustic features at various times in the speech input. The labelling data may be provided by users. Alternatively or additionally, the labelling data may be generated using the intent recognition system.

Although in the example of FIG. 1, the intent-recognition system 110 and the emotional text-to-speech system 112 are both in the user computing device 102, in other aspects, one or both of the intent-recognition system 110 and the emotional text-to-speech system 112 may be on one or more server computing devices, such as the server computing device 104. For example, the user computing device 102 may transmit speech input 118 that is received to the server computing device 104 for recognition. In another aspect, at least a portion of the speech interface learning system 122 is on the user computing device 102 and generates or updates one or both of the intent-recognition model 114 and the emotional text-to-speech model 116.

Figure 2:
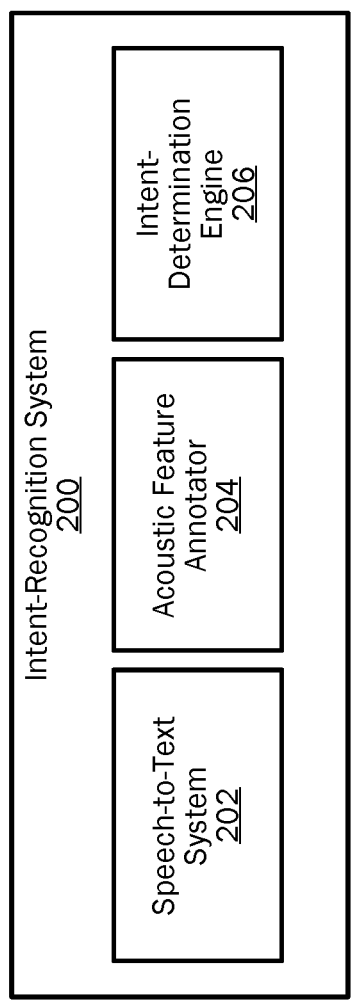
FIG. 2 is a schematic block diagram of an example of the intent-recognition system of FIG. 1.

FIG. 2 is a schematic block diagram of an example intent-recognition system 200. The intent-recognition system 200 is a nonexclusive example of an intent-recognition system, such as the intent-recognition system 110 illustrated in FIG. 1.

In this example, the intent-recognition system 200 includes a speech-to-text system 202, an acoustic feature annotator 204, and an intent-determination engine 206. The speech-to-text system 202 transcribes the words of a speech input. For example, the speech-to-text system 202 may convert the audio signal of the speech input to audio signal vectors, convert the audio signal vectors to a pronunciation sequence of pronunciation signals, and convert the pronunciation sequence to one or more words.

The acoustic feature annotator 204 annotates the speech input based on acoustic features extracted from the speech input. Examples of acoustic features include prosody, pitch, energy, and spectral harmonics. Prosody refers to the timing, stresses, and intonations in the speech input. The acoustic feature annotations may be associated with the full speech input, with particular words in the speech input, or with points or ranges of time within the speech input.

The intent-determination engine 206 determines an intent based on at least the text generated by the speech-to-text system 202 and the acoustic feature annotations generated by the acoustic feature annotator 204.

Figure 3:
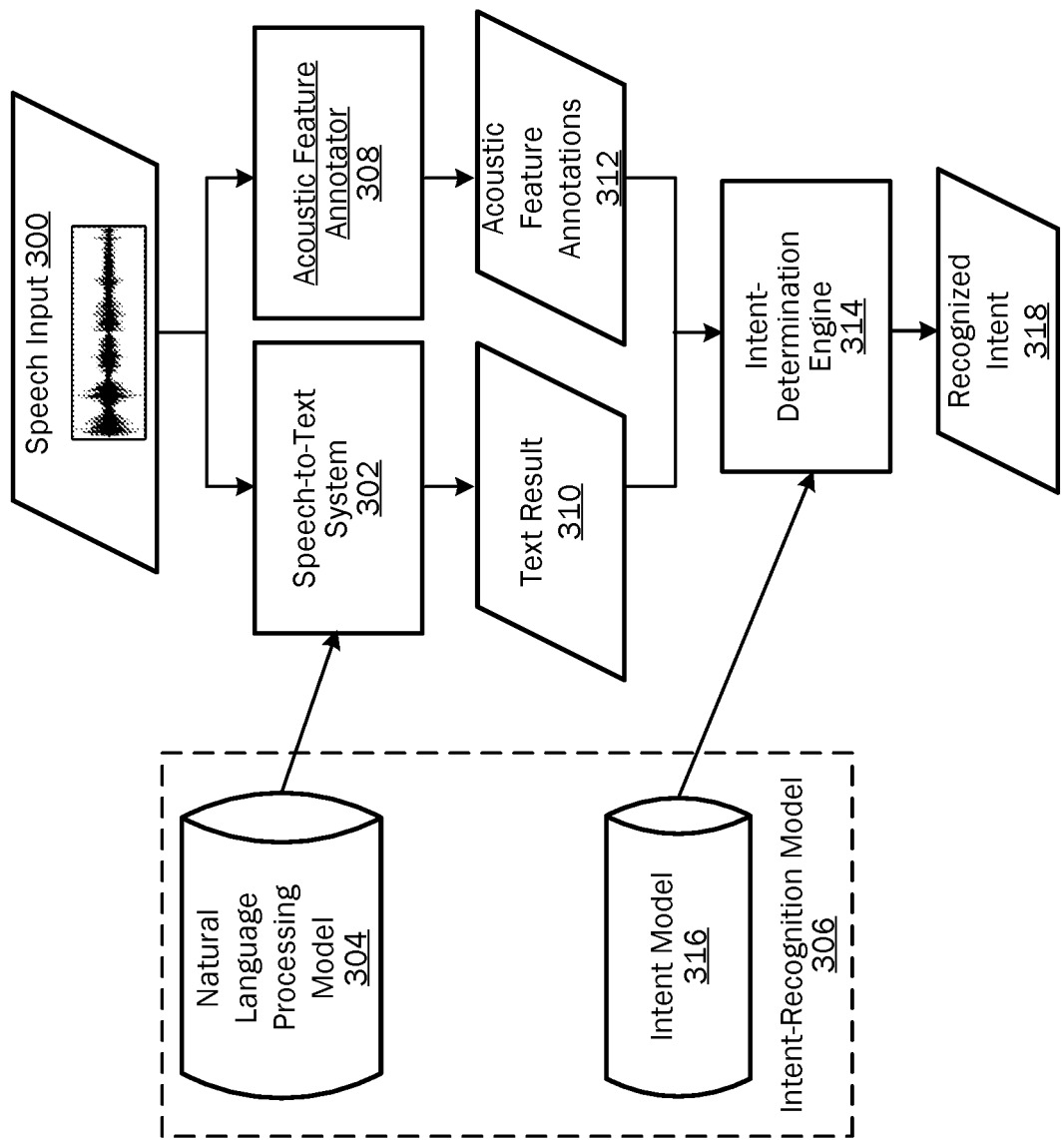
FIG. 3 is an example data flow for the example intent-recognition system of FIG. 2.

FIG. 3 is an example data flow for an example intent-recognition system, such as the intent-recognition system 200 illustrated in FIG. 2. In this example data flow, a speech input 300 is processed to generate a recognized intent 318. The recognized intent 318 may then be used to perform an action (e.g., provide directions, send a message, make a reservation, perform a search, etc.) or determine an appropriate response.

A speech-to-text system 302 converts the speech input 300 to a text result 310. The speech-to-text system 302 is a nonexclusive example of a speech-to-text system, such as the speech-to-text system 202. The text result 310 includes a textual representation of the words that are spoken in the speech input 300. In some aspects, the text result 310 may also include additional information associated with the words such as timestamps indicating when in the speech input 300 words are spoken and confidence scores indicating a probability the word has been correctly recognized.

The speech-to-text system 302 may use any known technique for converting speech input to text. As an example, the speech-to-text system 302 may convert the speech input 300 to a sequence of audio vectors; the sequence of audio vectors may be processed to generate a pronunciation sequence corresponding to the sequence of audio vectors; and the pronunciation sequence may be processed to generate a word or sequence of words.

The speech-to-text system 302 may use one or more models to convert the speech input 300 to the text result 310. For example, a natural language processing model 304 within an intent-recognition model 306 is used to convert the speech input 300 to the text result 310. The intent-recognition model 306 is a nonexclusive example of an intent-recognition model, such as the intent-recognition model 114 illustrated in FIG. 1. The natural language processing model 304 may comprise neural networks of one or more types, hidden Markov models, segmental models, super-segmental models (including hidden dynamic models), maximum entropy models, (hidden) conditional random fields, grammar models, and other types of models.

The acoustic feature annotator 308 annotates the speech input 300 with acoustic features to generate acoustic feature annotations 312. The acoustic feature annotator 308 may, for example, generate tags that identify the prosody, pitch, energy, and harmonics at various points in the speech input 300. In some aspects, the acoustic feature annotator 308 operates in parallel with the speech-to-text system 302 (i.e., the speech-to-text system 302 generates the text result 310 at the same time as the acoustic feature annotator 308 generates the acoustic feature annotations 312).

The acoustic feature annotator 308 may use various acoustic signal processing techniques and various models to identify acoustic features of the speech input 300. For example, the acoustic feature annotator 308 may use a prosody model to determine prosody values for the speech input 300. As another example, signal processing techniques may be used to determine the energy of the acoustic signal of one or more portions of the speech input 300. Fourier analysis may be used to identify the pitch of and harmonics present in various portions of the speech input 300. Other signal processing techniques may be used to identify pitch and harmonics as well.

The acoustic feature annotations 312 may include timestamps that relate the identified annotations to portions of the speech input 300 occurring at a particular time. The acoustic feature annotations 312 may also identify and be associated with particular words in the text result 310. Further, some of the acoustic feature annotations 312 may be associated with the entire speech input 300.

The intent-determination engine 314 generates a recognized intent 318 based on the text result 310 and the acoustic feature annotations 312. The text result 310 may be associated with an unambiguous intent (e.g., if the text result 310 includes the commands: "book one ticket on flight #134 from Minneapolis to Seattle on Apr. 1, 2016") the intent-determination engine 314 may not use the acoustic feature annotations 312 to determine the intent. Some aspects use an intent model 316 from the intent-recognition model 306 to generate the recognized intent 318. The intent model 316 may comprise neural networks of one or more types, hidden Markov models, segmental models, super-segmental models (including hidden dynamic models), maximum entropy models, (hidden) conditional random fields, grammar models, and other types of models.

In some aspects, the recognized intent 318 may include an action to be performed by the user computing device 102. The recognized intent 318 may also comprise a determination that no action should be taken such as when a command has been spoken with a sarcastic emotion. Additionally or alternatively, the recognized intent 318 may include an indication of a tone or emotion of the speech input 300. If multiple tones or emotions are identified in the speech input, the recognized intent may comprise a sequence of emotions that are associated with particular times in the speech input (e.g., the recognized intent may comprise tone or emotion annotations). In some aspects, the recognized intent 318 comprises a plurality of numeric weighting values representing multiple tones or intents (e.g., a recognized intent may include the values 0.7 for sarcastic, 0.2 for neutral, and 0.1 for happy).

Figure 4:
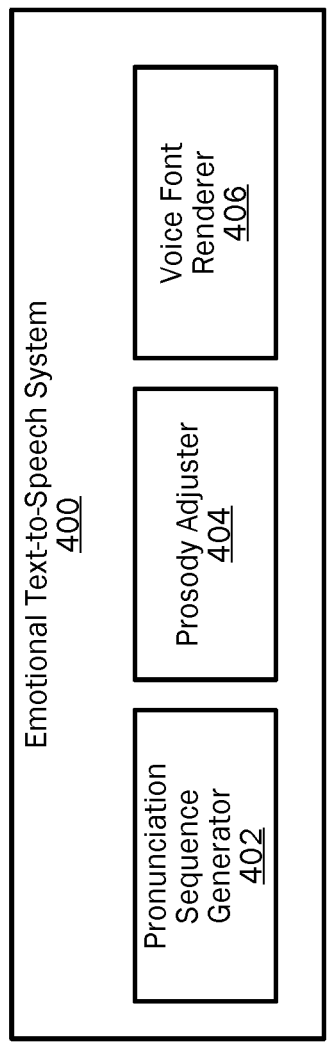
FIG. 4 is a schematic block diagram of an example of the emotional text-to-speech system of FIG. 3.

FIG. 4 is a schematic block diagram of an example emotional text-to-speech system 400. The emotional text-to-speech system 400 is a nonexclusive example of an emotional text-to-speech system, such as the emotional text-to-speech system 112 illustrated in FIG. 1.

In this example, the emotional text-to-speech system 400 includes a pronunciation sequence generator 402, a prosody adjuster 404, and a voice font renderer 406. The pronunciation sequence generator 402 generates a pronunciation sequence from text. The prosody adjuster 404 predicts prosody values for a pronunciation sequence based on a specified emotion or intent and adjusts the pronunciation sequence based on the predicted prosody values. The voice font renderer 406 renders a pronunciation sequence using a voice font based on a specified emotion or intent. Examples of these components are described in greater detail with respect to the flow diagram that follows.

Figure 5:
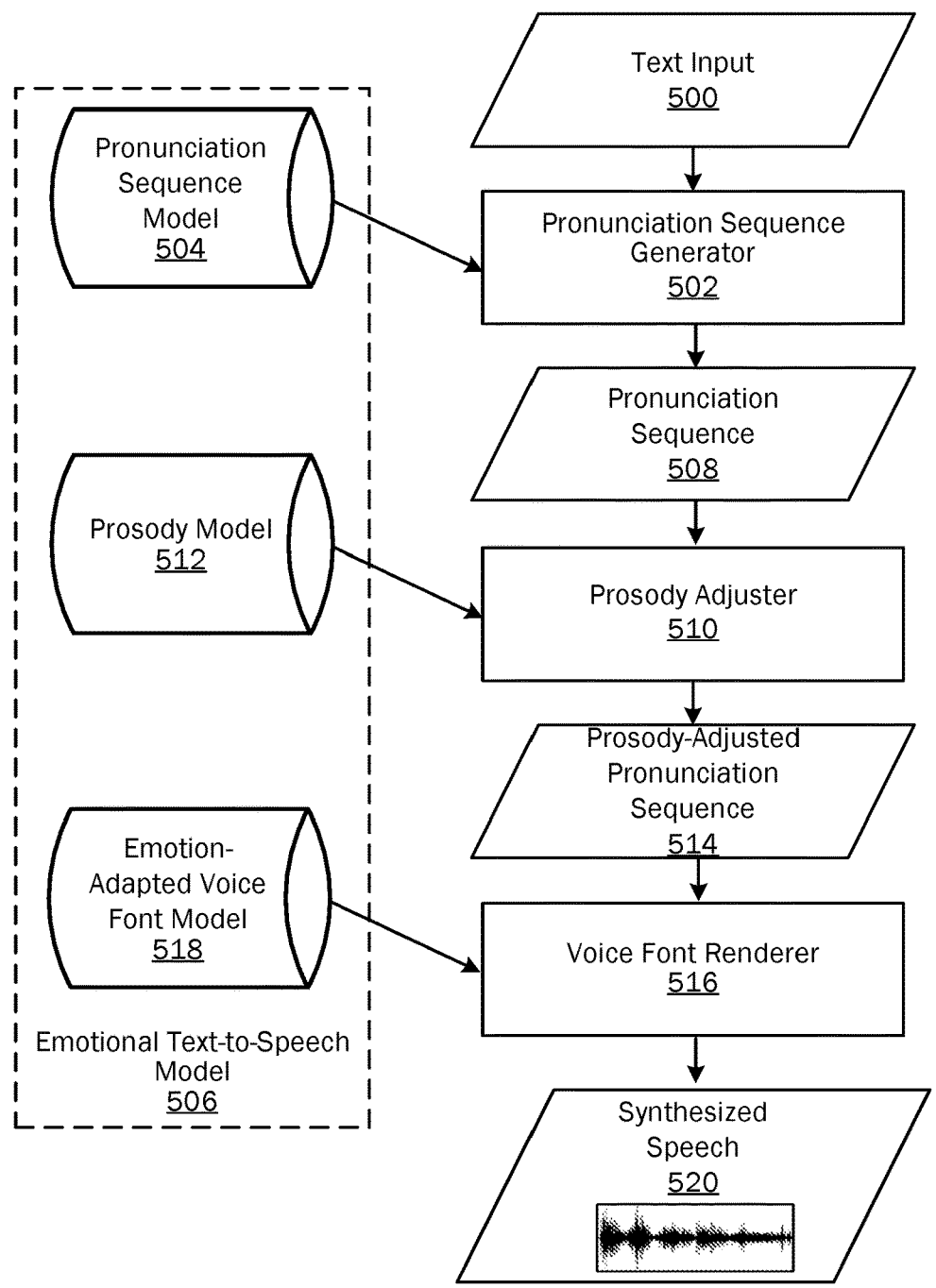
FIG. 5 is an example data flow for the example emotional text-to-speech system of FIG. 4.

FIG. 5 is an example data flow for an example emotional text-to-speech system, such as the emotional text-to-speech system 400 illustrated in FIG. 4. A pronunciation sequence generator 502 generates a pronunciation sequence 508 based on a text input 500. The pronunciation sequence generator 502 is a nonexclusive example of a pronunciation sequence generator, such as the pronunciation sequence generator 402 illustrated in FIG. 4. The text input 500 may be generated by an application running on the user computing device 102, received from the server computing device 104 (e.g., a webpage or a document), or entered by a user. The text input 500 may include data that identifies one or more emotions that should be used in rendering part or all of the text as well.

In some aspects, the pronunciation sequence generator 502 uses a pronunciation sequence model 504 of an emotional text-to-speech model 506 to generate the pronunciation sequence 508. The emotional text-to-speech model 506 is a non-exclusive example of an emotional text-to-speech model, such as the emotional text-to-speech model 116 of FIG. 1.

For example, the pronunciation sequence generator 502 may separate the text input 500 into words and then determine potential pronunciations for those words using the pronunciation sequence model 504. The pronunciation sequence model 504 may comprise neural networks of one or more types, hidden Markov models, segmental models, super-segmental models (including hidden dynamic models), maximum entropy models, (hidden) conditional random fields, grammar models, and other types of models.

The prosody adjuster 510 adjusts the pronunciation sequence 508 generated by the pronunciation sequence generator 502 using a prosody model 512 from the emotional text-to-speech model 506. The prosody adjuster 510 is a nonexclusive example of a prosody adjuster, such as the prosody adjuster 404 illustrated in FIG. 4.

In some aspects, the prosody adjuster 510 adjusts the pronunciation sequence 508 to generate the prosody-adjusted pronunciation sequence 514, in which at least some of the pronunciation signals are associated with prosody adjustments (e.g., timing signals indicating an adjusted duration of a pronunciation signal, pauses, etc.). In some aspects, the prosody model 512 uses the pronunciation sequence 508 and a desired emotion to predict the prosody adjustments for the pronunciation sequence 508. In some aspects, the prosody model 512 includes one or more types of neural networks, hidden Markov models, segmental models, super-segmental models (including hidden dynamic models), maximum entropy models, (hidden) conditional random fields, and other types of models.

The voice font renderer 516 renders the prosody-adjusted pronunciation sequence 514 using an emotion-adapted voice font model 518 to generate synthesized speech 520. The voice font renderer 516 is a nonexclusive example of a voice font renderer, such as the voice font renderer 406 illustrated in FIG. 4.

The emotion-adapted voice font model 518 may comprise a plurality of voice fonts that are usable to render synthesized speech 520. The voice fonts may, for example, correspond to different voices (e.g., a voice typical for a speaker of a particular age, gender, and/or geographic region) that may be used to render speech. In some aspects, the voice fonts specify various sounds and acoustic properties for pronunciation signals. The voice fonts may be adapted to emulate various emotions as well. In a simple example, the emotion-adapted voice font model 518 may include voice font models for a male speaker and a female speaker. Additionally, both of the voice font models may be adapted to generate speech corresponding to multiple different emotions (e.g., happy, neutral, and sarcastic) based on emotion data specified for the text input 500.

In some aspects, the voice font renderer 516 uses maps the pronunciation signals in the prosody-adjusted pronunciation sequence 514 to sounds using the emotion-adapted voice font model 518 to generate the synthesized speech 520. In some aspects, the synthesized speech 520 comprises an audio signal that can be output using a speaker.

Figure 6:
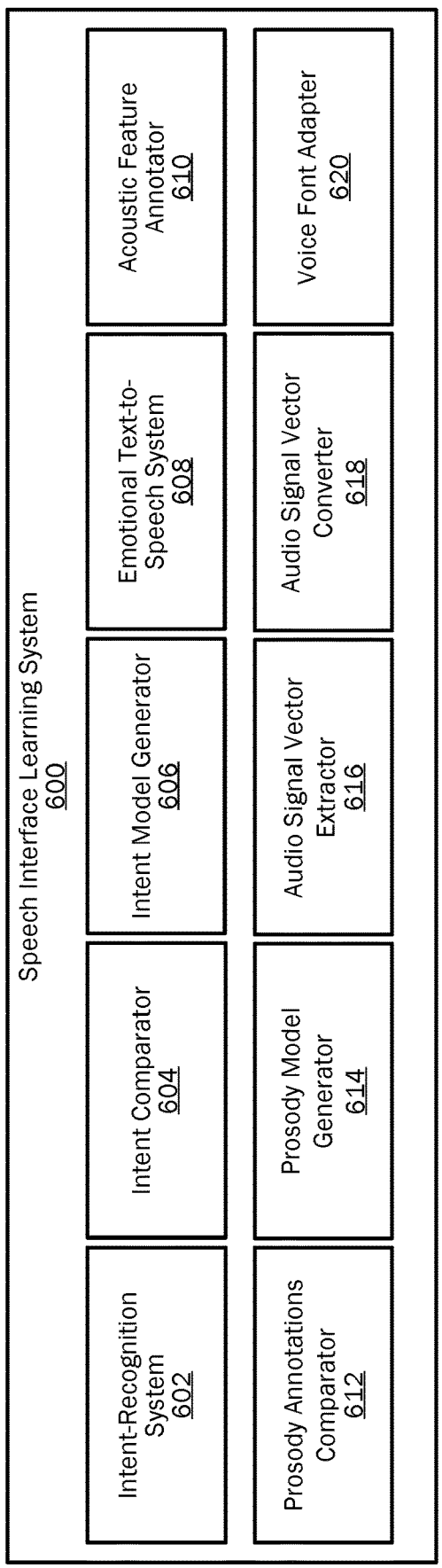
FIG. 6 is a schematic block diagram of the example of the speech interface learning system of FIG. 1.

FIG. 6 is a schematic block diagram of the example of the speech interface learning system 600. The speech interface learning system 600 generates models that are usable by the intent-recognition system 110 and the emotional text-to-speech system 112. For example, the speech interface learning system 600 may generate intent models such as the intent model 316, prosody models such as the prosody model 512, and emotion-adapted voice font model. In some aspects, the speech interface learning system 600 generates models for use by the intent-recognition system 110 and the emotional text-to-speech system 112 together. For example, when the various models are generated, the models may be stored in a network location that can be accessed by the user computing device 102 (e.g., a shared directory on the server computing device 104) or the models may be transmitted to the user computing device 102.

In this example, the speech interface learning system 600 includes an intent-recognition system 602, an intent comparator 604, an intent model generator 606, an emotional text-to-speech system 608, an acoustic feature annotator 610, prosody annotations comparator 612, prosody model generator 614, audio signal vector extractor 616, an audio signal vector converter 618, and a voice font adapter 620. Examples of these components are described in greater detail with respect to the example methods and data flow diagrams that follow.

The speech interface learning system 600 is a nonlimiting example of a speech interface learning system, such as the speech interface learning system 122. The intent-recognition system 602 may be similar to the intent-recognition system 110 of FIG. 1. The emotional text-to-speech system 608 may be similar to the emotional text-to-speech system 112 of FIG. 1. The acoustic feature annotator 610 may be similar to the acoustic feature annotator 204 of FIG. 2.

Figure 7:
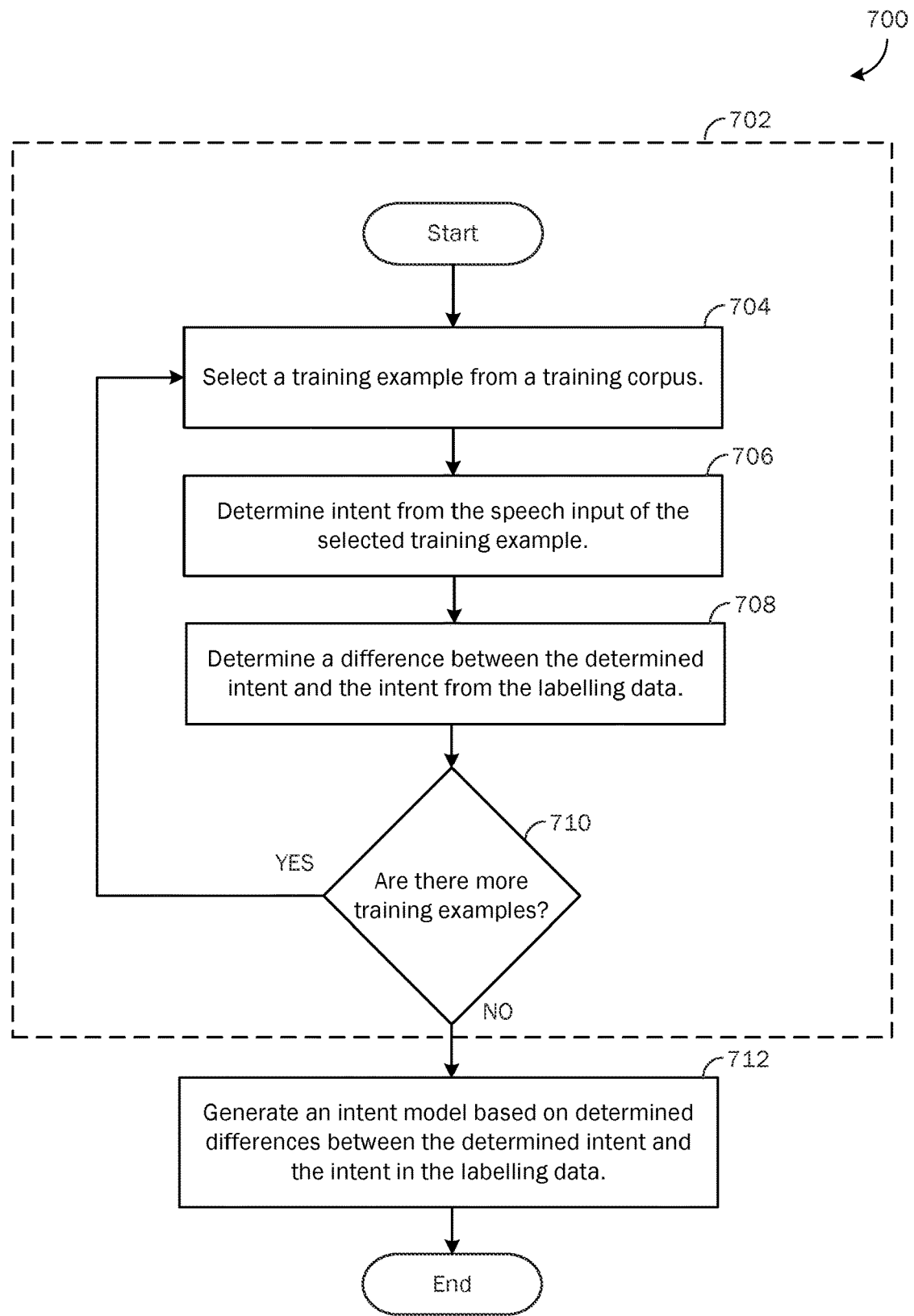
FIG. 7 illustrates an example method of generating an intent model performed by some aspects of the speech interface learning system of FIG. 1.
Figure 8:
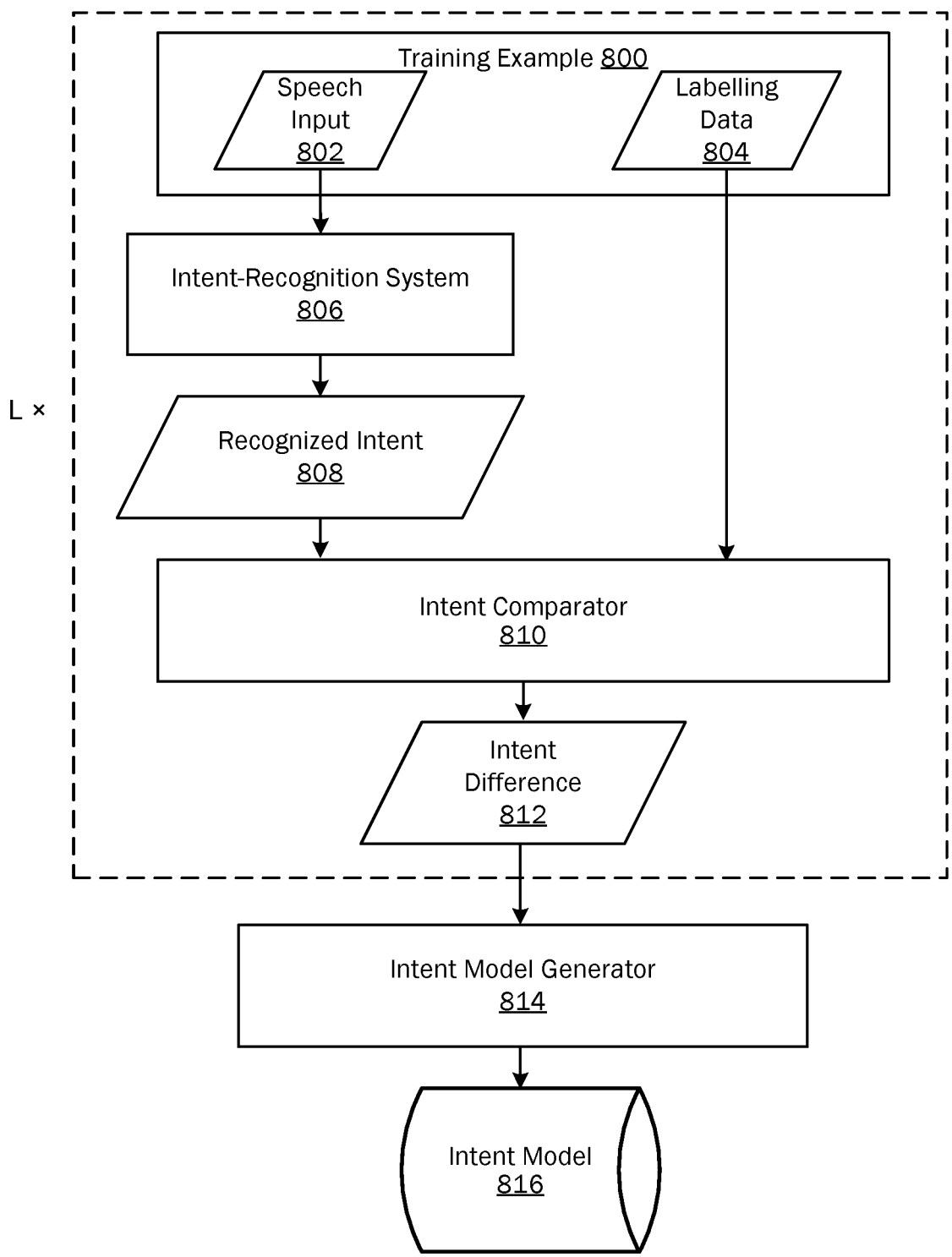
FIG. 8 illustrates an example data flow while the method of FIG. 7 is performed.

FIGS. 7 and 8 illustrate an example of the speech interface learning system 122 generating an intent model 816. FIG. 7 illustrates an example method 700 of generating an intent model 816 performed by some aspects of the speech interface learning system 122. FIG. 8 illustrates an example data flow while the method 700 is performed. In examples, the method 700 may be executed on a device comprising at least one processor configured to store and execute operations, programs, or instructions.

In some aspects, the method 700 begins with a loop 702, which may be performed once for each training example in a training corpus, such as the training corpus 124 illustrated in FIG. 1. The loop 702 may be performed on all of the training examples in the training corpus 124. Alternatively, the loop 702 may be performed on a subset of the training examples in the training corpus 124. For example, the loop 702 may be performed on the training examples that are from a particular speaker (e.g., the user shown in FIG. 1), that are from a particular group of speakers, or that convey a particular emotion.

At operation 704, a training example 800 is selected from the training corpus. The training example 800 comprises a speech input 802 and labelling data 804. The speech input 802 may comprise one or more words being spoken. The labelling data 804 includes the text of the word or words spoken in the speech input. The labelling data 804 may also include information about one or more of an emotion or intent associated with the speech. In some aspects, the speech input 802 is a recording of the words being spoken. The training examples may be selected from the training corpuses according to a variety of orders such as the order the training pairs were added to the corpuses, an identifier value assigned to the training pair, etc.

In some aspects, the labelling data 804 of the training example is provided by a user who listens to the speech input. Alternatively or additionally, the labelling data 804 is generated by an intent-recognition system such as the intent-recognition system 110 (or components thereof) processing the speech input 802. For example, a speech-to-text system, such as the speech-to-text system 202, may generate a transcript of the words spoken in the speech input 802. Similarly, an intent-determination engine 206, such as the intent-determination engine 206, may determine one or both of the emotion associated with the speech input 802 and the speaker's intent based on the speech input 802.

At operation 706, a recognized intent 808 is determined from the speech input 802. In some aspects, the recognized intent 808 is generated similarly to how the recognized intent 318 is generated when intent recognition is being performed by the intent-recognition system 110, which is illustrated and described with respect to at least FIG. 3. For example, a text result and acoustic feature annotations may be generated by a speech-to-text system and acoustic feature annotator respectively. An intent-determination engine may then use the text result and acoustic feature annotations to determine an intent or tone of the speech input 802.

At operation 708, an intent difference 812 between the recognized intent 808 and the intent in the labelling data 804 is determined by an intent comparator 810. The intent comparator 810 is a nonexclusive example of an intent comparator, such as the intent comparator 604 illustrated in FIG. 6. The recognized intent 808 may be aligned with the intent from the labelling data 804. The aligned intents may then be compared to one another to determine the difference between the recognized intent and the intent in the labelling data 804. However, in some aspects, the intents are not aligned before calculating a difference (e.g., when the intent is a single value (or array of values) that represent the entire speech input rather than a sequence of values representing portions of the speech input). The intent difference 812 may comprise a data structure that includes the changes (e.g., insertions, deletions, and substitutions) to the recognized intent 808 to arrive at the intent from the labelling data 804.

In some aspects, a distance is also calculated between the recognized intent 808 and the intent from the labelling data 804. The distance may comprise a numeric value with a magnitude that is related to the similarity between the recognized intent 808 and the intent from the labelling data 804 (e.g., a smaller distance indicates that the intents are more similar to one another than a larger distance).

At operation 710, it is determined whether there are more training examples to process in the loop 702. If so, the method 700 returns to operation 704, to repeat the loop 702 on a different training example 800. If not, the method 700 proceeds to operation 712. For example, if there are L number of training examples, the loop 702 may be performed L times to generate L number of the intent differences 812.

At operation 712, the intent model 816 is generated based on the differences 812 generated in the loop 702. The intent model 816 is a nonexclusive example of an intent model, such as the intent model 316 illustrated in FIG. 3. For example, the intent model 816 may be generated by the intent model generator 814. The intent model generator 814 is a nonexclusive example of an intent model generator, such as the intent model generator 606 illustrated in FIG. 6.

In some aspects, a portion of the training examples in the training corpus are used to train the intent model 816. Additionally, a portion of the training examples in the training corpus may be used as validation data to validate the intent model 816. For example, various parameters of the intent model 816 may be adjusted using optimization techniques (e.g., hill climbing, gradient descent) to improve the performance of the intent model 816 on the validation data.

Figure 9:
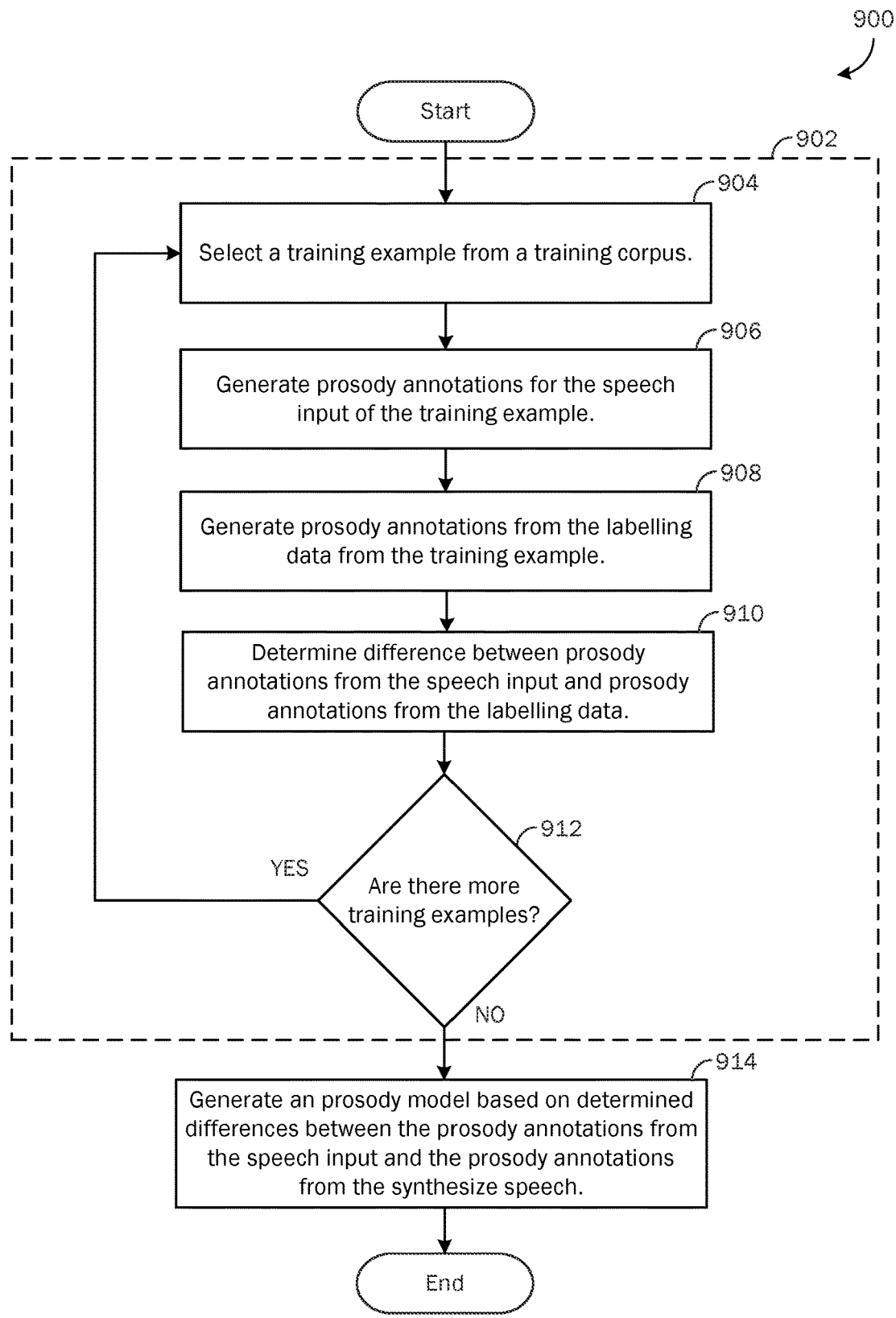
FIG. 9 illustrates an example method of generating a prosody model performed by some aspects of the speech interface learning system of FIG. 6.
Figure 10:
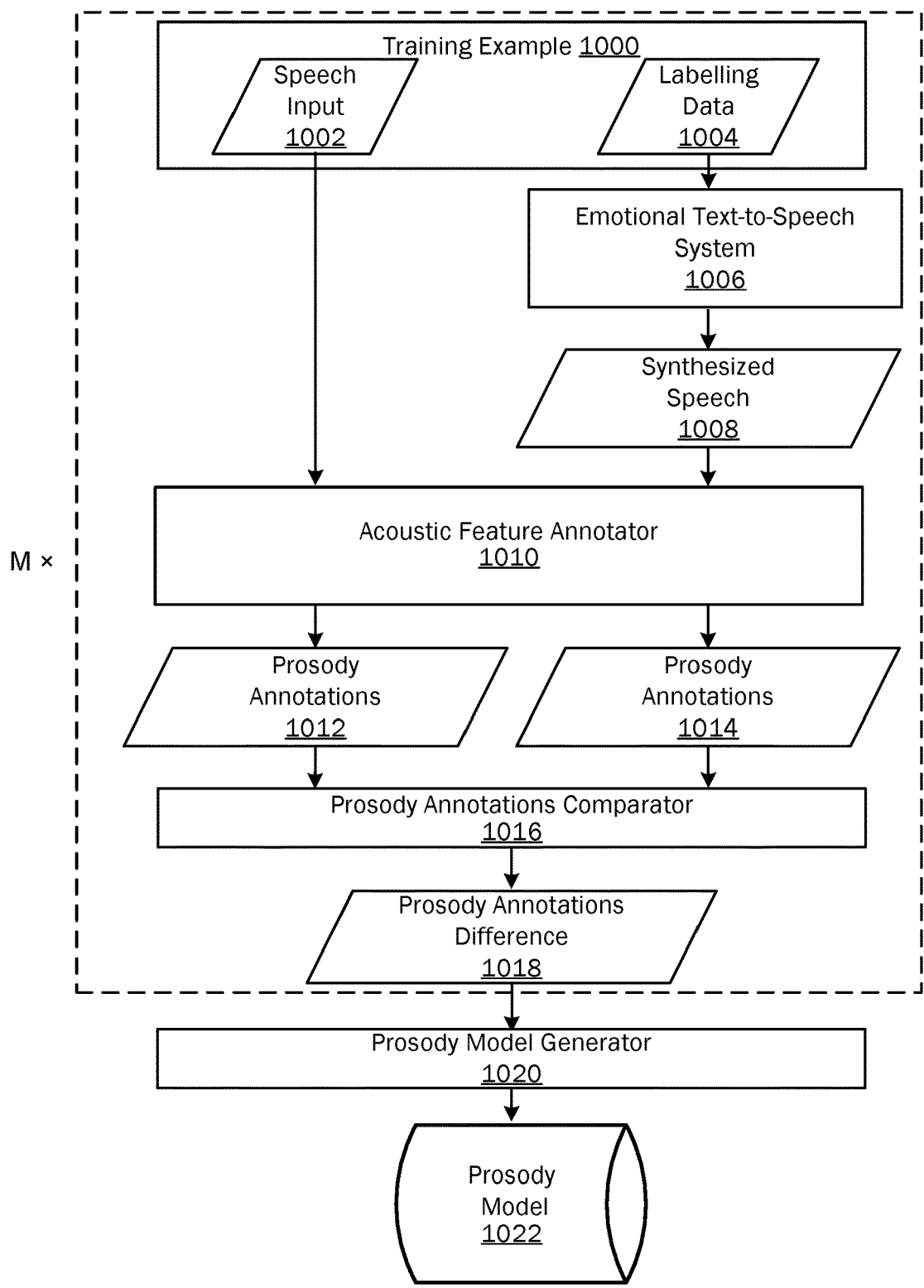
FIG. 10 illustrates an example data flow while the method of FIG. 9 is performed.

FIGS. 9 and 10 illustrate an example of a speech interface learning system, such as the speech interface learning system 122, generating a prosody model 1026. FIG. 9 illustrates an example method 900 of generating a prosody model 1022 performed by some aspects of the speech interface learning system 122. FIG. 10 illustrates an example data flow while the method 900 is performed. In examples, the method 900 may be executed on a device comprising at least one processor configured to store and execute operations, programs, or instructions.

In some aspects, the method 900 begins with a loop 902, which may be performed once for each training example 1000 in a training corpus such as the training corpus 124.

At operation 904, a training example 1000 is selected from the training corpus. In some aspects, the operation 904 is similar to the operation 704, which has been previously described with respect to at least FIG. 7. The training example 1000 comprises a speech input 1002 comprising one or more words being spoken and a labelling data 1004 associated with the speech input 1002. The training example 1000 may be similar to training example 800, which has been previously described with respect to at least FIG. 8.

At operation 906, prosody annotations 1012 are generated from the speech input 1002. In some aspects, the prosody annotations 1012 are generated by the acoustic feature annotator 1010. The acoustic feature annotator 1010 is a nonexclusive example of an acoustic feature annotator, such as the acoustic feature annotator 610 and may operate similarly to the acoustic feature annotator 308, which has been previously described with respect to at least FIG. 3.

At operation 908, prosody annotations 1014 are generated from the labelling data 1004. In some aspects, the prosody annotations 1014 are generated by generating synthesized speech 1008 from the labelling data 1004 and then annotating the synthesized speech 1008 using the acoustic feature annotator 1010. For example, in some aspects, the labelling data 1004 is processed with an emotional text-to-speech system 1006 to generate the synthesized speech 1008. The emotional text-to-speech system 1006 is a nonexclusive example of an emotional text-to-speech system, such as the emotional text-to-speech system 112 illustrated in FIG. 1.

At operation 910, a prosody annotations difference 1018 between the prosody annotations 1012 (from the speech input 1002) and the prosody annotations 1014 (from the labelling data 1004) is determined by the prosody annotations comparator 1016. The prosody annotations comparator 1016 is a nonexclusive example of a prosody annotations comparator, such as the prosody annotations comparator 612 illustrated in FIG. 6. In some aspects, the prosody annotations difference 1018 comprises a data structure that includes the changes (e.g., insertions, deletions, and substitutions) to the prosody annotations 1014 to arrive at the prosody annotations 1012. In some aspects, a distance is also calculated between the prosody annotations 1012 and the prosody annotations 1012. The distance may comprise a numeric value with a magnitude that is related to the similarity between the prosody annotations 1012 and prosody annotations 1014.

At operation 912, it is determined whether there are more training examples to process in the loop 902. If so, the method 900 returns to operation 904, to repeat the loop 902 on a different training example 1000. If not, the method 900 proceeds to operation 914. For example, if there are M number of training examples, the loop may be performed M times to generate M number of the prosody annotations differences 1018.

At operation 914, the prosody model 1022 is generated by a prosody model generator 1020 based on the prosody annotations differences 1018 between the prosody annotations 1012 and the prosody annotations 1014 determined in the loop 902. The prosody model generator 1020 is a nonexclusive example of a prosody model generator, such as the prosody model generator 614 illustrated in FIG. 6. The prosody model 1022 is a nonexclusive example of a prosody model, such as the prosody model 512 illustrated in FIG. 5.

In some aspects, the prosody model 1022 is generated to approximately convert the synthesized speech 1008 that currently produces prosody annotations 1014 (from the labelling data 1004) to synthesized speech that would produce the prosody annotations 1012 (from the speech input 1002). In other words, the prosody model 1022 may be generated so that when used in speech synthesis the synthesized speech will match the prosody of the speech input. In some aspects, one or more portions of the training examples in the training corpus are used to train the prosody model 1022. For example, the training examples that correspond to a particular speaker, speaking style, or emotion may be used to train the prosody model 1022 to generate speech with a matching prosody. Additionally, a portion of the training examples in the training corpus may be used as validation data to validate the prosody model 1022. For example, various parameters of the prosody model 1022 may be adjusted using optimization techniques (e.g., hill climbing, gradient descent) to improve the performance of the prosody model 1022 on the validation data.

Figure 11:
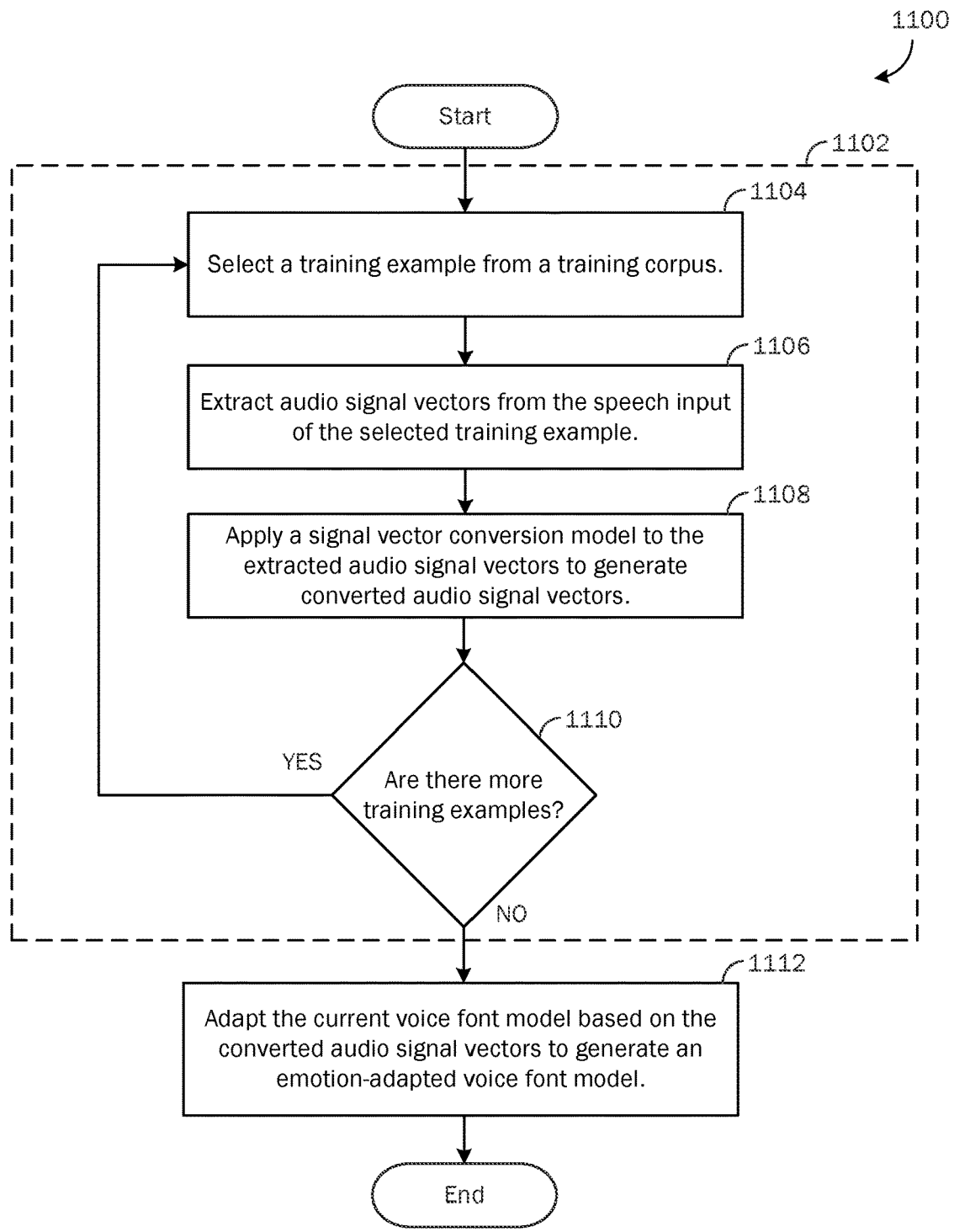
FIG. 11 illustrates an example method of adapting a current voice font model performed by some aspects of the speech interface learning system of FIG. 6.
Figure 12:
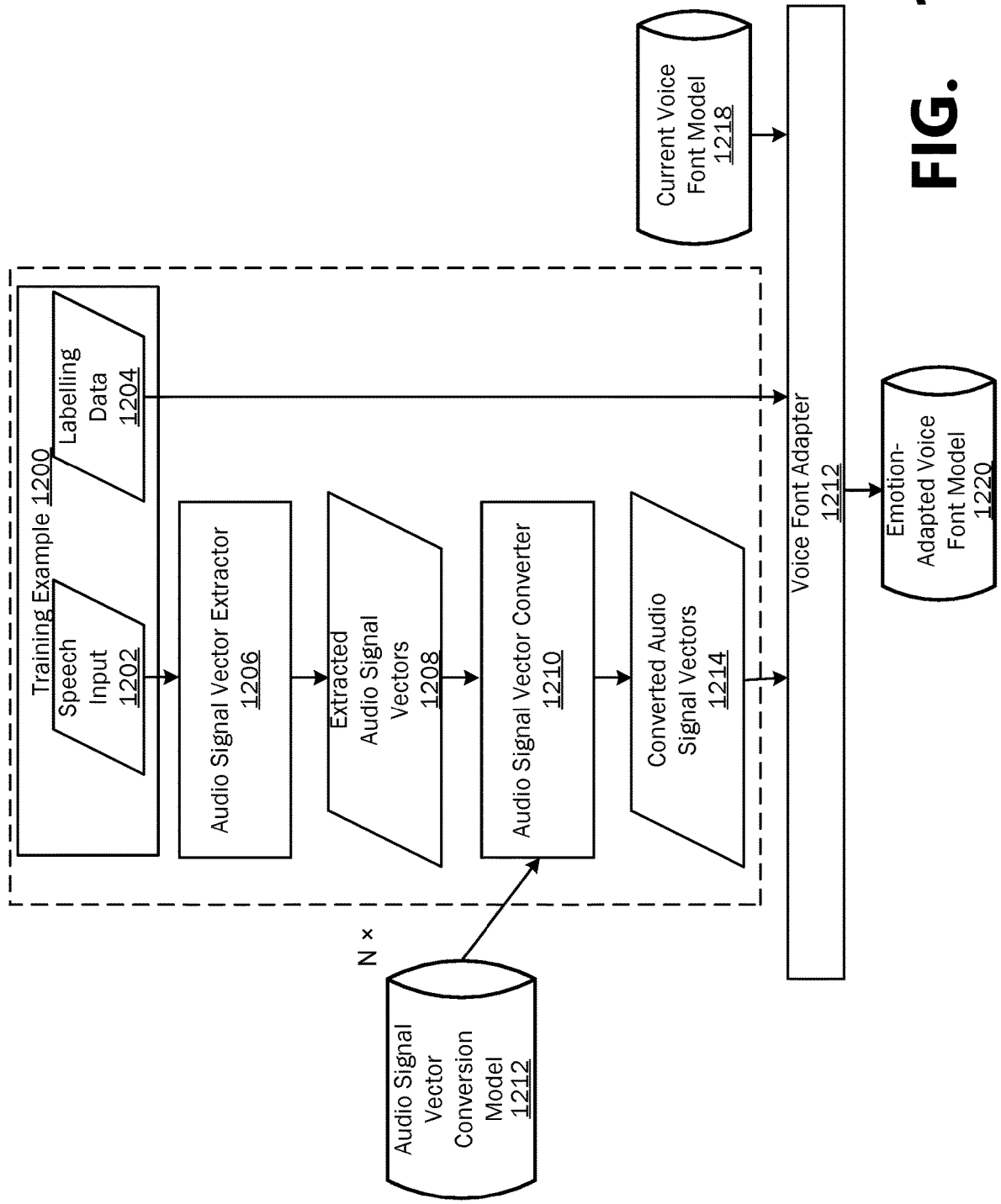
FIG. 12 illustrates an example data flow while the method of FIG. 11 is performed.

FIGS. 11 and 12 illustrate an example of a speech interface learning system, such as the speech interface learning system 122 of FIG. 1, adapting a current voice font model to generate an emotion-adapted voice font model. FIG. 11 illustrates an example method 1100 of adapting a current voice font model performed by some aspects of the speech interface learning system 122. FIG. 12 illustrates an example data flow while the method 1100 is performed. In examples, the method 1100 may be executed on a device comprising at least one processor configured to store and execute operations, programs, or instructions.

In some aspects, the method 1100 begins with a loop 1102, which may be performed once for each training example 1200 that is available. In some aspects, the training examples are selected from a training corpus such as the training corpus 124. The loop 1102 may be performed on all of the training examples in the training corpus 124. Alternatively, the loop 1102 may be performed on a subset of the training examples in the training corpus 124. For example, the loop 1102 may be performed on the training examples from a particular speaker, a particular group of speakers, or that convey a particular emotion.

At operation 1104, a training example 1200 is selected from the training corpus. The training example 1200 comprises a speech input 1202 and labelling data 1204. The speech input 1202 may comprise one or more words being spoken. The labelling data 1204 includes the text of the word or words spoken in the speech input. The labelling data 1204 may also include information about one or more of an emotion or intent associated with the speech. In some aspects, the speech input 1202 is a recording of the words being spoken. The training examples may be selected from the training corpuses according to a variety of orders such as the order the training pairs were added to the corpuses, an identifier value assigned to the training pair, etc.

In some aspects, the labelling data 1204 of the training example is provided by a user who listens to the speech input. Alternatively or additionally, the labelling data 1204 is generated by an intent-recognition system such as the intent-recognition system 110 (or components thereof) processing the speech input 1202. For example, a speech-to-text system, such as the speech-to-text system 202, may generate a transcript of the words spoken in the speech input 1202. Similarly, an intent-determination engine 206, such as the intent-determination engine 206, may determine one or both of an emotion associated with the speech input 1202 and the speaker's intent based on the speech input 1202.

At operation 1106, audio signal vectors 1208 are extracted from the speech input 1202 of the selected training example 1200. In some aspects, the audio signal vector extractor 1206 extracts the audio signal vectors 1208 by sampling the speech input 1202 and determining the amplitude of the audio signal of the speech input 1202 at various frequencies. The audio signal vector extractor 1206 is a nonexclusive example of an audio signal vector extractor, such as the audio signal vector extractor 616 illustrated in FIG. 6.

At operation 1108, an audio signal vector conversion model 1212 is applied to the extracted audio signal vectors 1208 by the audio signal vector converter 1210 to generate converted audio signal vectors 1214. The audio signal vector converter 1210 is a nonexclusive example of an audio signal vector converter, such as the audio signal vector converter 618 illustrated in FIG. 6.

The audio signal vector conversion model 1212 may be used to convert the extracted audio signal vectors 1208 to converted audio signal vectors 1214, which may be more useful in recognizing the speech in the speech input. The audio signal vector conversion model 1212 may include a recursive neural network. Additionally or alternatively, the audio signal vector conversion model 1212 may include other types of neural networks, hidden Markov models, segmental models, super-segmental models (including hidden dynamic models), maximum entropy models, (hidden) conditional random fields, and other types of models.

The audio signal vector conversion model 1212 may be generated based on training examples from a training corpus such as the training corpus 124 of FIG. 1. For example, the emotional text-to-speech model 116 may be used to generate an audio signal vector from labelling data of a training example, while an audio signal vector extractor is used to extract an audio signal vector from a speech input of the training example. These two audio signal vectors can be compared and used, at least in part, to generate an audio signal vector conversion model that may be used to adapt a voice font model. The audio signal vector conversion model may also be used by an intent recognition system such as the intent-recognition system 110. Beneficially, by comparing the intermediary audio signal vectors to train the speech-recognition model, the speech interface learning system can generate models that may perform better during speech recognition.

Although the method 1100 that is illustrated in FIG. 11 applies a signal vector conversion model at operation 1108, alternatives are possible. For example, some aspects do not include the step of applying a signal vector conversion model and instead the extracted audio vectors are used without conversion.

At operation 1110, it is determined whether there are more training examples to process in the loop 1102. If so, the method 1100 returns to operation 1104, to repeat the loop 1102 on another training example. If not, the method 1100 proceeds to operation 1112. For example, if there are N number of speech inputs (e.g., there are N number of training pairs), the loop may be performed N times to generate N number of the converted audio signal vectors 1214.

At operation 1112, a current voice font model 1218 is adapted by the voice font adapter 1216 based on the converted audio signal vectors 1214 to generate an emotion-adapted voice font model 1220. As noted above, some aspects do not include the step of applying a signal vector conversion model. In these aspects, the extracted audio signal vectors 1208 may be used by the voice font adapter rather than the converted audio signal vectors.

The voice font adapter 1216 is a nonexclusive example of a voice font adapter, such as the voice font adapter 620 illustrated in FIG. 6. The emotion-adapted voice font model 1220 is a non-exclusive example of an emotion-adapted voice font model, such as the emotion-adapted voice font model 518 illustrated in FIG. 5. In some aspects, the emotion-adapted voice font model 1220 is then used in future text-to-speech operations.

The emotion-adapted voice font model 1220 may comprise a voice font model that has been adapted to convey one or more different emotions. For example, the emotion-adapted voice font model 1220 may be adapted for use generating speech that sounds angry, happy, sarcastic, or urgent as well as speech that is emotion neutral (i.e., in a voice that does not convey any particular emotion). The current voice font model 1218 may be a neutral voice font model that is configured to generate speech that does not convey any particular emotion. Alternatively, the current voice font model 1218 may be a previously adapted emotion-adapted voice font model that is being further adapted based on additional training data.

In some aspects, the emotion-adapted voice font model 1220 is generated frequently (or even continuously) as new training data becomes available. For example, after the emotion-adapted voice font model 1220 is generated and new training data is received or identified, the emotion-adapted voice font model 1220 may be used as the current voice font model 1218 and may be further adapted by the voice font adapter 1216 based on the new training data. Alternatively or additionally, the emotion-adapted voice font model 1220 may be generated periodically. Once generated, the emotion-adapted voice font model 1220 may be stored on the server computing device 104 or in another location where it may be accessed by the emotional text-to-speech system 112. Additionally or alternatively, the emotion-adapted voice font model 1220 may be transferred (e.g., as part of an application update) to the user computing device 102 for use by the emotional text-to-speech system 112.

The voice font models (e.g., the current voice font model 1218 and the emotion-adapted voice font model 1220) may comprise a deep neural network. Additionally or alternatively, the voice font models may comprise one or more other types of neural networks, hidden Markov models, segmental models, super-segmental models (including hidden dynamic models), maximum entropy models, (hidden) conditional random fields, Gaussian models such as Gaussian mixture models, grammar models, and other types of models. In some aspects, adapting the voice font models comprises adjusting various parameters of the models such as weighting parameters so that the voice font model produces speech that is similar to training data associated with a particular emotion.

In some aspects, the emotion-adapted voice font model 1220 is included in the emotional text-to-speech system 112 and used by the emotional text-to-speech system 112 to synthesize speech that conveys emotions. In some aspects, a voice font renderer, such as the voice font renderer 516, uses the emotion-adapted voice font model 518 to generate synthesized speech during text-to-speech operations as illustrated and described with respect to at least FIG. 5.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, watches, netbooks, tablet or slate type computers, notebook computers, and laptop computers), handheld devices, entertainment devices (e.g., smart televisions, media players including streaming media players, gaming systems), multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 13:
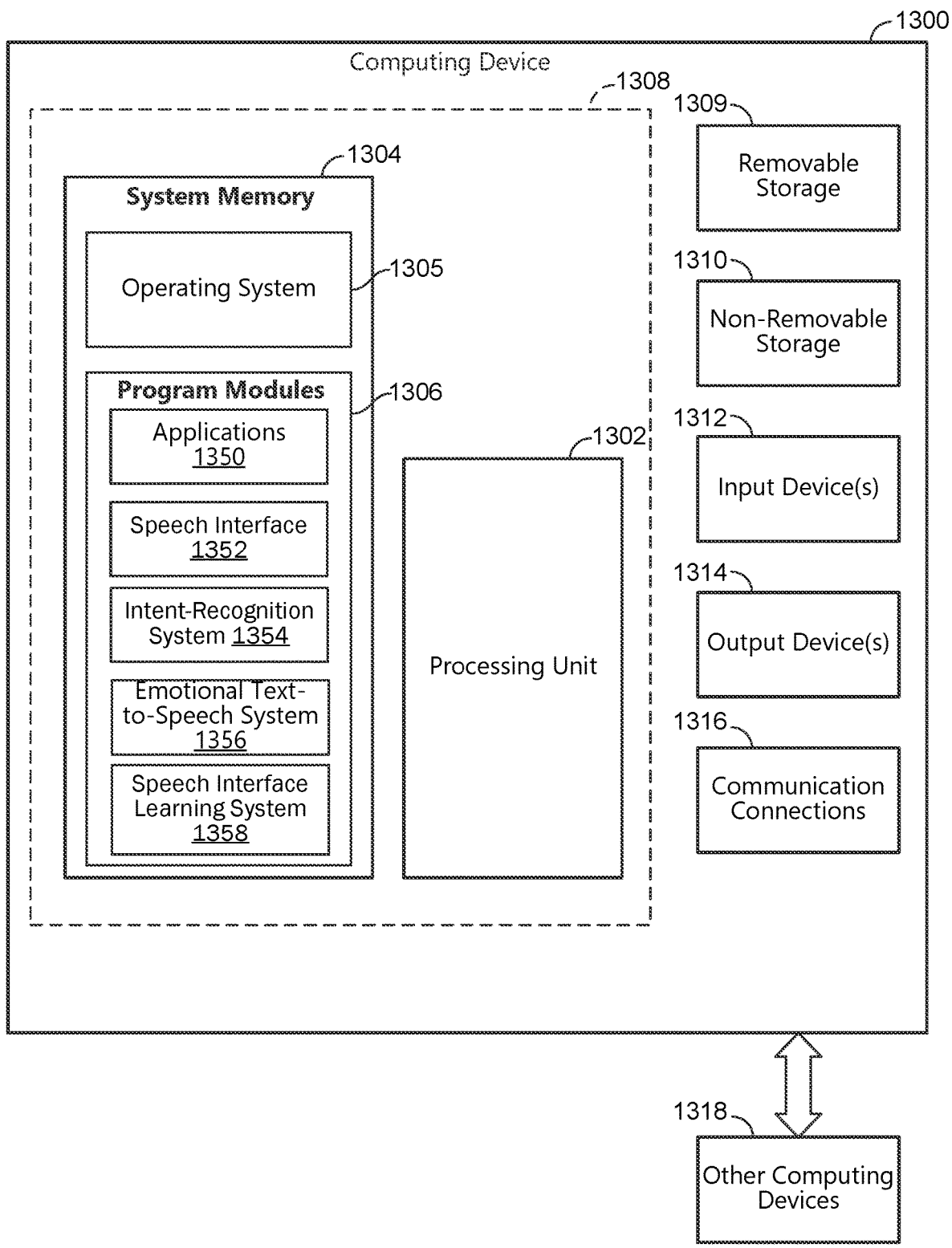
FIG. 13 is a block diagram illustrating example physical components of a computing device.
Figure 14A:
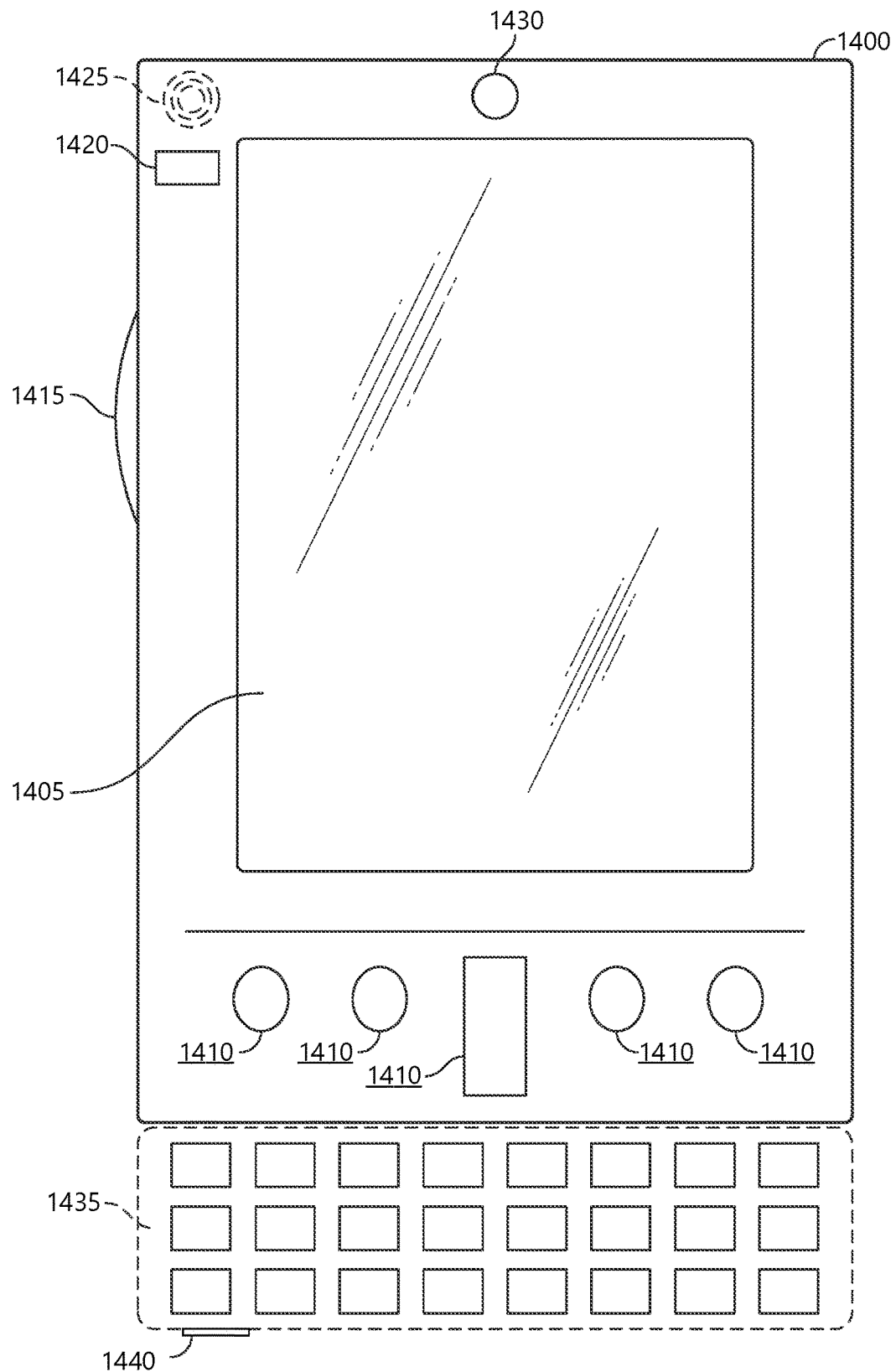
FIGS. 14A and 14B are block diagrams of a mobile computing device.
Figure 14B:
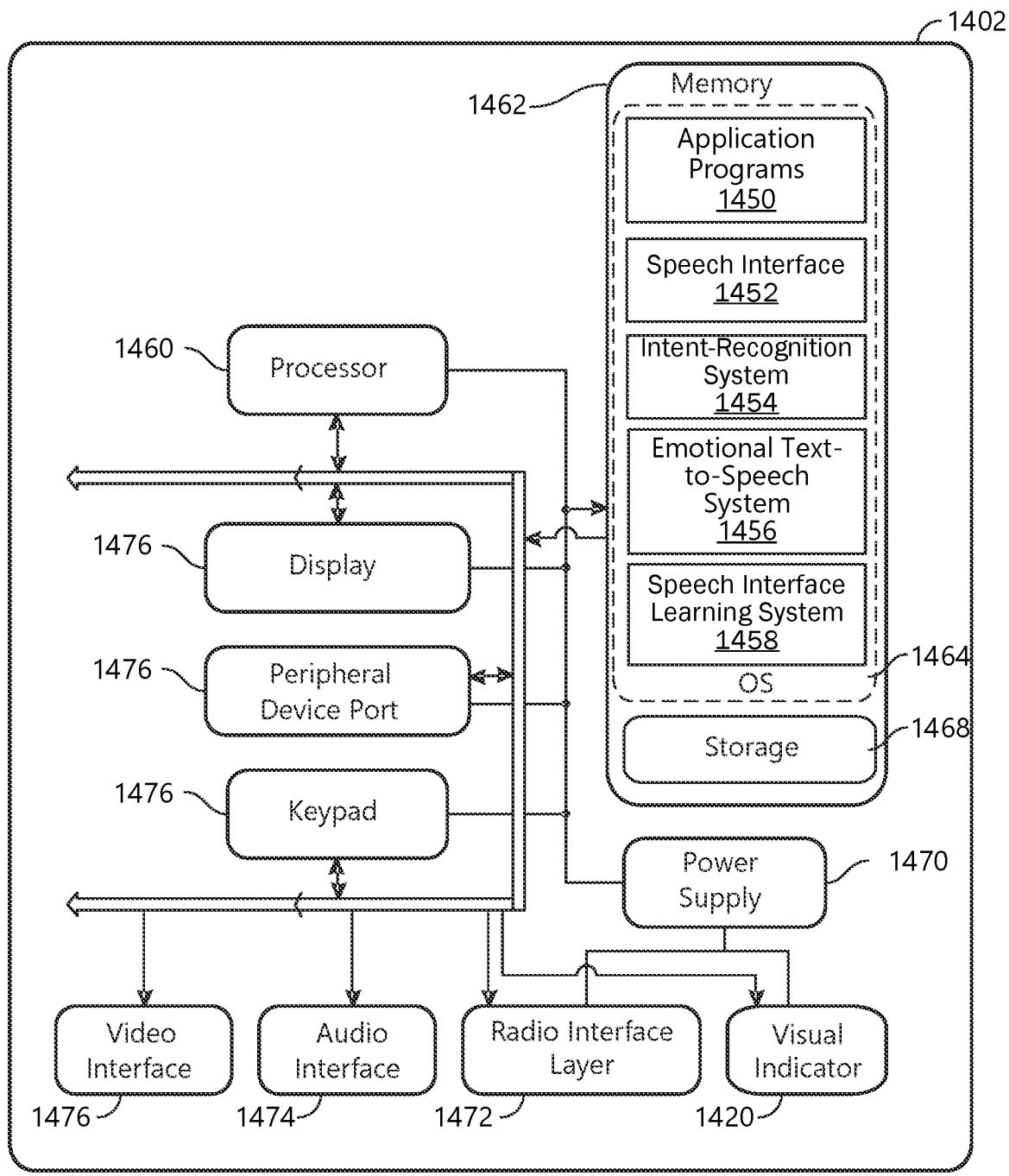
Figure 15:
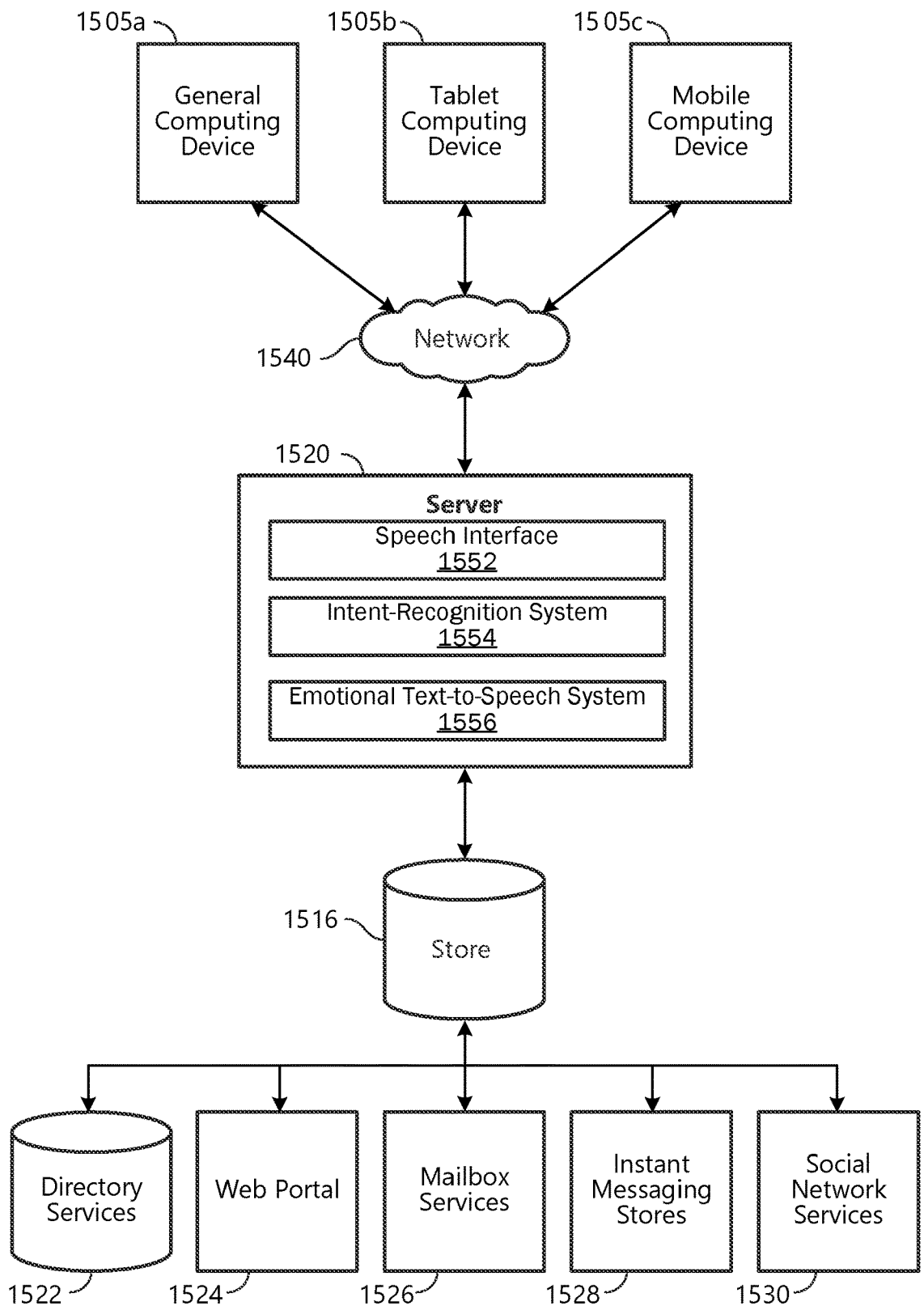
FIG. 15 is a block diagram of a distributed computing system.

FIGS. 13-15 and the associated descriptions provide a discussion of a variety of operating environments in which examples are practiced. However, the devices and systems illustrated and discussed with respect to FIGS. 13-15 are for purposes of example and illustration and are not limiting of a vast number of computing device configurations that are utilized for practicing aspects, described herein.

FIG. 13 is a block diagram illustrating physical components (i.e., hardware) of a computing device 1300 with which examples of the present disclosure may be practiced. The physical components described below are examples of the physical components of aspects of the user computing device 102 and the server computing device 104. In a basic configuration, the computing device 1300 includes at least one processing unit 1302 and a system memory 1304. According to an aspect, depending on the configuration and type of computing device, the system memory 1304 comprises, but is not limited to, volatile storage (e.g., random access memory), non-volatile storage (e.g., read-only memory), flash memory, or any combination of such memories. According to an aspect, the system memory 1304 includes an operating system 1305 and one or more program modules 1306 suitable for running software applications 1350 and, for example, one or more of a speech interface 1352, which may be similar to the speech interface 108; a intent-recognition system 1354, which may be similar to the intent-recognition system 110; an emotional text-to-speech system 1356, which may be similar to the emotional text-to-speech system 112; and a speech interface learning system 1358, which may be similar to the speech interface learning system 122. The operating system 1305, for example, is suitable for controlling the operation of the computing device 1300. Furthermore, aspects are practiced in conjunction with a graphics library, other operating systems, or any other application program, and are not limited to any particular application or system. This basic configuration is illustrated in FIG. 13 by those components within a dashed line 1308. According to an aspect, the computing device 1300 has additional features or functionality. For example, according to an aspect, the computing device 1300 includes additional data storage devices (removable and/or non-removable) such as, for example, magnetic disks, optical disks, or tapes. Such additional storage is illustrated in FIG. 13 by a removable storage device 1309 and a non-removable storage device 1310.

As stated above, according to an aspect, a number of program modules and data files are stored in the system memory 1304. While executing on the processing unit 1302, the program modules 1306 (e.g., speech interface 108, speech interface learning system 122) perform processes including, but not limited to, one or more of the operations of the methods 700, 900, and 1100 illustrated in FIGS. 7, 9, and 11 respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 13 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1300 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1300 has one or more input device(s) 1312 such as a keyboard, a mouse, a pen, a sound input device, a touch input device, etc. The output device(s) 1314 such as a display, speakers, a printer, etc. are also included according to an aspect. The aforementioned devices are examples and others may be used. According to an aspect, the computing device 1300 includes one or more communication connections 1316 allowing communications with other computing devices 1318. Examples of suitable communication connections 1316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 1304, the removable storage device 1309, and the non-removable storage device 1310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. According to an aspect, any such computer storage media is part of the computing device 1300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 14A and 14B illustrate a mobile computing device 1400, for example, a mobile telephone, a smart phone, a tablet personal computer, a laptop computer, and the like, with which aspects may be practiced. With reference to FIG. 14A, an example of a mobile computing device 1400 for implementing the aspects is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. According to an aspect, the display 1405 of the mobile computing device 1400 functions as an input device (e.g., a touch screen display). If included, an optional side input element 1415 allows further user input. According to an aspect, the side input element 1415 is a rotary switch, a button, or any other type of manual input element. In alternative examples, mobile computing device 1400 incorporates more or fewer input elements. For example, the display 1405 may not be a touch screen in some examples. In alternative examples, the mobile computing device 1400 is a portable phone system, such as a cellular phone. According to an aspect, the mobile computing device 1400 includes an optional keypad 1435. According to an aspect, the optional keypad 1435 is a physical keypad. According to another aspect, the optional keypad 1435 is a "soft" keypad generated on the touch screen display. In various aspects, the output elements include the display 1405 for showing a graphical user interface (GUI), a visual indicator 1420 (e.g., a light emitting diode), and/or an audio transducer 1425 (e.g., a speaker). In some examples, the mobile computing device 1400 incorporates a vibration transducer for providing the user with tactile feedback. In yet another example, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1400 incorporates peripheral device port 1440, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one example of a mobile computing device. That is, the mobile computing device 1400 incorporates a system (i.e., an architecture) 1402 to implement some examples. In one example, the system 1402 is implemented as a "smart phone" capable of running one or more applications (e.g., browser, e-mail, calendaring, contact managers, messaging clients, games, and media clients/players). In some examples, the system 1402 is integrated as a computing device, such as an integrated personal digital assistant (PDA) and wireless phone.

According to an aspect, one or more application programs 1450 are loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. According to an aspect, one or more of a speech interface 1452, which may be similar to the speech interface 108; a intent-recognition system 1454, which may be similar to the intent-recognition system 110; an emotional text-to-speech system 1456, which may be similar to the emotional text-to-speech system 112; and a speech interface learning system 1458, which may be similar to the speech interface learning system 122, are loaded into memory 1462. The system 1402 also includes a non-volatile storage area 1468 within the memory 1462. The non-volatile storage area 1468 is used to store persistent information that should not be lost if the system 1402 is powered down. The application programs 1450 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400.

According to an aspect, the system 1402 has a power supply 1470, which is implemented as one or more batteries. According to an aspect, the power supply 1470 further includes an external power source, such as an AC adapter or a powered docking cradle that supplements or recharges the batteries.

According to an aspect, the system 1402 includes a radio 1472 that performs the function of transmitting and receiving radio frequency communications. The radio 1472 facilitates wireless connectivity between the system 1402 and the "outside world," via a communications carrier or service provider. Transmissions to and from the radio 1472 are conducted under control of the operating system 1464. In other words, communications received by the radio 1472 may be disseminated to the application programs 1450 via the operating system 1464, and vice versa.

According to an aspect, the visual indicator 1420 is used to provide visual notifications and/or an audio interface 1474 is used for producing audible notifications via the audio transducer 1425. In the illustrated example, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. According to an aspect, the system 1402 further includes a video interface 1476 that enables an operation of an on-board camera 1430 to record still images, video stream, and the like.

According to an aspect, a mobile computing device 1400 implementing the system 1402 has additional features or functionality. For example, the mobile computing device 1400 includes additional data storage devices (removable and/or non-removable) such as, magnetic disks, optical disks, or tape. Such additional storage is illustrated in FIG. 14B by the non-volatile storage area 1468.

According to an aspect, data/information generated or captured by the mobile computing device 1400 and stored via the system 1402 are stored locally on the mobile computing device 1400, as described above. According to another aspect, the data are stored on any number of storage media that are accessible by the device via the radio 1472 or via a wired connection between the mobile computing device 1400 and a separate computing device associated with the mobile computing device 1400, for example, a server computer in a distributed computing network, such as the Internet. As should be appreciated such data/information are accessible via the mobile computing device 1400 via the radio 1472 or via a distributed computing network. Similarly, according to an aspect, such data/information are readily transferred between computing devices for storage and use according to well-known data/information transfer and storage means, including electronic mail and collaborative data/information sharing systems.

FIG. 15 illustrates one example of the architecture of a system for speech interface with a speech interface learning system as described above. Content developed, interacted with, or edited in association with the speech interface 108 is enabled to be stored in different communication channels or other storage types. For example, various documents may be stored using a directory service 1522, a web portal 1524, a mailbox service 1526, an instant messaging store 1528, or a social networking site 1530. The speech interface 108 is operative to use any of these types of systems or the like for based on speech input from the user, as described herein. According to an aspect, a server 1520 provides the speech interface 108 to clients 1505*a*, 1505*b*, and 1505*c*. As one example, the server 1520 is a web server providing one or more of a speech interface 1552, which may be similar to the speech interface 108; a intent-recognition system 1554, which may be similar to the intent-recognition system 110; and an emotional text-to-speech system 1556, which may be similar to the emotional text-to-speech system 112, over the web. The server 1520 provides one or more of the speech interface 1552, the intent-recognition system 1554, and the emotional text-to-speech system 1556 over the web to clients 1505 through a network 1540. By way of example, the client computing device is implemented and embodied in a personal computer 1505*a*, a tablet computing device 1505*b*, or a mobile computing device 1505*c* (e.g., a smart phone), or other computing device. Any of these examples of the client computing device are operable to obtain content from the store 1516.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

The invention claimed is:

1. A system for adapting an emotional text-to-speech model, the system comprising:
at least one processor; and
memory, operatively connected to the at least one processor and storing instructions that, when executed by the at least processor, cause the at least one processor to:
receive training examples comprising speech input;
receive labelling data comprising emotion information associated with the speech input;
extract audio signal vectors from the training examples;
adapt a voice font model based on the audio signal vectors and the labelling data to generate an emotion-adapted voice font model;
generate first prosody annotations from the speech input;
generate second prosody annotations from the labelling data;
determine differences between the first prosody annotations and the second prosody annotations;
generate a prosody model based on the determined differences between the first prosody annotations and the second prosody annotations;
generate a prosody-adjusted pronunciation sequence for text input using the prosody model; and
render the text input to synthesized speech using the emotion-adapted voice font model and the prosody-adjusted pronunciation sequence.

2. The system of claim 1, wherein the memory further stores instructions that, when executed by the at least one processor, cause the at least one processor to apply an audio signal vector conversion model to the extracted audio signal vectors to generate converted audio signal vectors, and wherein the voice font model is adapted based on the converted audio signal vectors.

3. The system of claim 1, wherein the labelling data is generated by an intent recognition system processing the speech input of the training examples.

4. The system of claim 3, wherein the memory further stores instructions that, when executed by the at least one processor, cause the at least one processor to generate the labelling data for the speech input.

5. The system of claim 1, wherein the labelling data further comprises audio feature annotations for the speech input.

6. The system of claim 1, wherein the emotion-adapted voice font model is usable by an emotional text-to-speech system to generate synthesized speech that conveys a particular emotion.

7. A method for generating an emotional text-to-speech model, the method comprising:
receiving training examples comprising speech input;
receiving labelling data comprising emotion information associated with the speech input;
extracting audio signal vectors from the training examples;
applying an audio signal vector conversion model to the extracted audio signal vectors to generate converted audio signal vectors;
adapting a voice font model based on the converted audio signal vectors and the labelling data to generate an emotion-adapted voice font model;
generating first prosody annotations from the speech input;
generating second prosody annotations from the labelling data;
determining differences between the first prosody annotations and the second prosody annotations;
generating a prosody model based on the determined differences between the first prosody annotations and the second prosody annotations;
generating a prosody-adjusted pronunciation sequence for text input using the prosody model; and
rendering the text input to synthesized speech using the emotion-adapted voice font model and the prosody-adjusted pronunciation sequence.

8. The method of claim 7, wherein the labelling data is generated by an intent recognition system processing the speech input of the training examples.

9. The method of claim 7, wherein the labelling data further comprises audio feature annotations for the speech input.

10. The method of claim 7, wherein the emotion-adapted voice font model is usable by an emotional text-to-speech system to generate synthesized speech that conveys a particular emotion.

11. Computer storage media storing instructions that, when executed by at least one processor, cause the at least one processor to:
receive training examples comprising speech input;
receive labelling data comprising emotion information associated with the speech input;
extract audio signal vectors from the training examples;
adapt a voice font model based on the audio signal vectors and the labelling data to generate an emotion-adapted voice font model;
generate first prosody annotations from the speech input;
generate second prosody annotations from the labelling data;
determine differences between the first prosody annotations and the second prosody annotations;
generate a prosody model based on the determined differences between the first prosody annotations and the second prosody annotations;
generate a prosody-adjusted pronunciation sequence for text input using the prosody model; and
render the text input to synthesized speech using the emotion-adapted voice font model and the prosody-adjusted pronunciation sequence.

12. The computer storage media of claim 11, further comprising instructions that, when executed by the at least one processor, cause the at least one processor to apply an audio signal vector conversion model to the extracted audio signal vectors to generate converted audio signal vectors, and wherein the voice font model is adapted based on the converted audio signal vectors.

13. The computer storage media of claim 11, wherein the labelling data is generated by an intent recognition system processing the speech input of the training examples.

14. The computer storage media of claim 11, further comprising instructions that, when executed by the at least one processor, cause the at least one processor to generate the labelling data for the speech input.

15. The computer storage media of claim 11, wherein the labelling data further comprises audio feature annotations for the speech input.

16. The computer storage media of claim 11, wherein the emotion-adapted voice font model is usable by an emotional text-to-speech system to generate synthesized speech that conveys a particular emotion.

* * * * *